United States Patent [19]

Rinde et al.

[11] Patent Number: 4,507,340
[45] Date of Patent: Mar. 26, 1985

[54] ADHESIVES AND DEVICES COATED THEREWITH

[75] Inventors: James A. Rinde, Fremont; Eugene F. Lopez, Sunnyvale; Leon C. Glover, Los Altos, all of Calif.

[73] Assignee: Raychem Corporation, Menlo Park, Calif.

[21] Appl. No.: 173,946

[22] Filed: Jul. 31, 1980

[51] Int. Cl.$^3$ ............................................. F16L 11/00
[52] U.S. Cl. .................................. 428/36; 428/418; 174/DIG. 8; 138/143; 138/110
[58] Field of Search ................ 428/418, 36; 138/99, 138/110, 141, 143, 145, 146, 178, DIG. 1, DIG. 7; 174/DIG. 8; 525/122, 107, 423, 524

[56] References Cited

U.S. PATENT DOCUMENTS

| | | | |
|---|---|---|---|
| 2,847,395 | 5/1958 | Wear | 428/414 |
| 3,382,121 | 5/1968 | Sherlock | 174/DIG. 8 |
| 3,390,704 | 7/1968 | Woodell | 138/143 |
| 3,496,250 | 2/1970 | Czerwinski | 260/37 EP |
| 3,655,815 | 4/1972 | McKown | 525/524 |
| 3,707,583 | 1/1973 | McKown | 427/27 |
| 3,894,113 | 7/1975 | Pagel | 525/122 |
| 4,035,534 | 7/1977 | Nyberg | 428/36 |
| 4,077,927 | 3/1978 | McPherson | 525/524 |
| 4,130,546 | 12/1978 | Goto et al. | 525/122 |
| 4,181,775 | 1/1980 | Corke | 428/348 |
| 4,197,880 | 4/1980 | Cordia | 138/99 |
| 4,206,786 | 6/1980 | Wetmore | 174/DIG. 8 |
| 4,237,609 | 12/1980 | Clabburn et al. | 29/859 |
| 4,295,494 | 10/1981 | McGowan et al. | 138/89 |

OTHER PUBLICATIONS

Holmes patent application Ser. No. 06/150,840, filed 5/19/80.

*Primary Examiner*—John E. Kittle
*Assistant Examiner*—James J. Seidleck
*Attorney, Agent, or Firm*—Timothy H. P. Richardson

[57] ABSTRACT

Novel curable adhesives are solid, substantially free of cross-linking and substantially tack-free at 25° C.; remain substantially uncured when maintained for extended periods at 80° C.; have an initial viscosity of $10^3$ to $10^4$ poise at 150° C. and cure relatively slowly at 150° C.; and cure rapidly at 200° C. The adhesives preferably contain at least one epoxy resin, particularly an epoxy resin having a softening point of at least 50° C. and an epoxy equivalent weight of at least 200 in combination with an epoxy resin which is liquid at 25° C. or an elastomer or other compatible high molecular weight polymer. The adhesive preferably also contains a high temperature curing agent and preferably also a filler, which may be particulate or fibrous. The novel adhesives are particularly useful in combination with heat-recoverable devices, e.g. devices comprising components made of heat-recoverable metal.

29 Claims, No Drawings

1

ADHESIVES AND DEVICES COATED THEREWITH

BACKGROUND OF THE INVENTION

1. Field of the Invention

This invention relates to curable adhesives.

2. Summary of the Prior Art

Curable adhesives, in particular epoxy adhesives which are cured by heat with the aid of curing agents, are well known. The use of such adhesives in conjunction with heat-recoverable metal devices is described in copending, commonly assigned Applications Nos. 1,372 and 107,656 (Binkley), both now abandoned, the contents of which have been published as German Offenlegungschrift No. 3,000,204.

SUMMARY OF THE INVENTION

In one aspect, the present invention provides a curable adhesive composition which (a) is solid, substantially free of crosslinking and substantially tack-free at 25° C., and preferably at 50° C.;

(b) after having been heated rapidly to 80° C., maintained at 80° C. for 10 days, and preferably for 16 days, and heated rapidly to 150° C., has a viscosity at 150° C. of at most $5 \times 10^4$ poise;

(c) when heated rapidly to 150° C. has an initial viscosity at 150° C. of $10^3$ to $10^4$ poise and after having been maintained at 150° C. for 1 hour has a viscosity at 150° C. of at most $5 \times 10^4$ poise; and (d) when heated rapidly to 200° C. and after having been maintained at 200° C. for 10 minutes, and preferably for 5 minutes, has cured to a viscosity at 200° C. of at least $5 \times 10^5$ poise.

We have found that such adhesives give particularly good results when used in conjunction with heat-recoverable articles, and in another aspect the invention provides a heat-recoverable device which has on one surface thereof an adhesive composition as defined above, the device preferably having a recovery temperature of 100 to 200° C., especially 150° to 200° C. Particular examples of such devices are described in the copending commonly assigned and contemporaneously filed applications of Cook et al. Ser. No. 174,804, and Broyles Ser. No. 173,948, the disclosures of which are incorporated herein by reference.

The adhesives can also be used to provide coatings, and in another aspect the invention provides a pipe (or other article), preferably of metal, having a coating thereon (preferably on the internal surface thereof) of a composition obtained by curing an adhesive composition as defined above.

DETAILED DESCRIPTION OF THE INVENTION

Percentages are given by weight throughout this specification; the viscosities referred to are measured on a Rheometric mechanical spectrometer using parallel plates and a measuring frequency of 1.0 Rad/sec; and the softening points are measured by Durran's Mercury Method.

The adhesives preferably contain at least 65%, especially at least 85%, of a curable resin component, at least 40%, preferably at least 70%, of the curable resin component being at least one polyfunctional epoxy resin. We have found that in order to produce the desired characteristics at 25° C., and preferably at 50° C., the curable resin component preferably comprises at least 40% of at least one solid epoxy resin having a softening point of at least 50° C. and an epoxy equivalent weight of at least 110, preferably at least 200, e.g. an epoxy novolak resin. In one class of compositions, the curable resin component comprises (a) 10 to 30% of a flexible epoxy resin having a viscosity at 25° C. of 10 to 100 poise, preferably 15 to 60 poise, and an epoxy equivalent weight of 500 to 1000, and (b) 50 to 90% of at least one solid epoxy resin having a softening point of at least 50° C. and an epoxy equivalent weight of at least 110, preferably at least 175, for example a mixture of (i) at least one epoxy resin which has an epoxy equivalent weight of at least 175 and which is substantially free of hydroxyl functionality (e.g. a novolak epoxy resin) and (ii) at least one epoxy resin which has an epoxy equivalent weight of at least 375 (e.g. a Bisphenol A epoxy resin).

The curable resin component can contain curable resins which are not epoxy resins, e.g. curable elastomers such as carboxyl-containing nitrile rubbers, and halogenated polyvinyl phenols.

The adhesives can contain polymers which do not take part in the curing reaction but which are compatible with the epoxy resins. The amount of such polymers is generally less than 40%, preferably 10 to 30%, based on the weight of the composition. Such polymers generally have a molecular weight of at least 5,000 and include for example polyamides and elastomers, e.g. nitrile rubbers. Thus a second class of compositions comprise (a) 40 to 90% of at least one epoxy resin having a softening point of at least 50° C. and an epoxy equivalent weight of at least 110, preferably at least 175, for example a mixture of (i) at least one epoxy resin which has an epoxy equivalent weight of at least 175 and which is substantially free of hydroxyl functionality and (ii) at least one epoxy resin which has an epoxy equivalent weight of at least 375; and (b) 10 to 30% of a polymer which is compatible with the epoxy resin and which has a molecular weight of at least 5,000.

The adhesives will contain a high temperature curing agent for the epoxy resin, e.g. isophthaloyl dihydrazide or one of the other curing agents used in the Examples below. The adhesives preferably contain 1 to 10% by weight of a filler, which may be a particulate high surface area filler such as fumed silica, talc or titanium dioxide to act as a thickening agent, or a fibrous filler such as graphite, glass or organic polymer fibers. The adhesives preferably contain, usually in amount less than 1%, a fluorine-substituted surfactant to act as a wetting agent for the surface to which the adhesive is to bond. The adhesives may also contain other conventional additives such as corrosion inhibitors, flame retardants, abrasion resistant materials, e.g. $Al_2O_3$, pigments, e.g. carbon black, biologically active ingredients, and additives to produce desired electrical characteristics.

The ingredients of the adhesive can be mixed together by conventional techniques.

As indicated above, the adhesives are particularly useful when used in the form of a layer on the surface of a heat-recoverable article to bond the article to a surface which is contacted by the article when it recovers.

The layer may be for example 1 to 200 mils, preferably 20 to 75 mils, thick. The properties of the adhesive are such that, especially when the recovery temperature of the article is 100° to 200° C., preferably 150° to 200° C., a layer of the adhesive will remain coherent and non-sagging while the article is heated to its recovery temperature, will flow and conform to the surface against which it is pressed, and will cure rapidly thereafter. The adhesives will bond to a wide variety of surfaces, including for example polymers and metals. Some polymers, e.g. fluoropolymers, may require to be surface-treated in order to ensure the best results, and the presence of plasticisers in the polymers is preferably avoided. The term "heat-recoverable article" is used herein to include any article which will change shape when heated, including articles comprising a member composed of a heat-recoverable metal or cross-linked polymer and articles comprising a member which is held in an elastically deformed state by a restraint which ceases to exert its restraining effect when heated.

The invention is illustrated by the following Examples. Each of the adhesives prepared in the Examples (a) is solid, substantially free of crosslinking and substantially tack-free at 25° C.;

(b) after having been heated rapidly to 80° C., maintained at 80° C. for 10 days, and heated rapidly to 150° C., has a viscosity at 150° C. of less than $5 \times 10^4$ poise;

(c) when heated rapidly to 150° C. has an initial viscosity at 150° C. of $10^3$ to $10^4$ poise and after having been maintained at 150° C. for 1 hour has a viscosity at 150° C. of at most $5 \times 10^4$ poise; and (d) when heated rapidly to 200° C. and after having been maintained at 200° C. for 10 minutes, has cured to a viscosity at 200° C. of at least $5 \times 10^5$ poise.

EXAMPLES 1-7

Adhesives were made by mixing together the various ingredients and amounts thereof (in parts by weight) shown in the Table below.

TABLE

| Example No. | 1 | 2 | 3 | 4 | 5 | 6 | 7 |
|---|---|---|---|---|---|---|---|
| Epon 872 | | 20 | 20 | | 20 | | |
| Hycar 1042 | | | | 20 | | 20 | 20 |
| Epon 1001 | | | 40 | | 10 | 40 | 40 |
| Resin MB | | | | | | 60 | |
| ECN 1280 | | 80 | 40 | 80 | 70 | 40 | 40 |
| ECN 1299 | 100 | | | | | | |
| Melamine | 9 | 7.8 | | | | | |
| Dicyandiamide | | | 6.7 | | | | |
| FC 509 | | | | 6 | | | |
| Anchor 1725 | | | | | 16 | | |
| DDS | | | | | | | 15 |
| Cab-o-Sil TS-200 | 5 | 4 | 3 | | 4 | | |
| TiO₂ | | | | 1 | | | |
| ¼" glass fibers | 2 | 2 | 2 | | 3 | | |
| FC-430 | .05 | .05 | .05 | | .25 | | |

The various ingredients are further identified below.

Epon 872 (available from Shell) is a flexible epoxy resin having an epoxy equivalent weight of 650-750 and a viscosity at 25° C. of 15-38 poise.

Hycar 1042 (available from B. F. Goodrich) is a nitrile rubber containing 27-28% acrylonitrile and substantially free of carboxylic acid groups.

Epon 1001 (available from Shell) is a diglycidyl ether of bisphenol A having a softening point of 65°-75° C. and an epoxy equivalent weight of 450-550.

Resin MB (available from Maruzen Oil Co.) is a brominated poly (p-vinyl phenol) having a molecular weight of 3,000-4,000, a melting point of 190°-220° C., a bromine content of 47-52% and a hydroxy equivalent weight of 224-246.

ECN 1280 (available from Ciba-Geigy) is a cresolformaldehyde novolak which has a melting point of about 80° C. and an epoxy equivalent weight of about 230, and which is substantially free of hydroxyl functionality.

ECN 1299 (available from Ciba-Geigy) is a cresolformaldehyde novolak resin having a melting point of about 99° C., an epoxy equivalent weight of about 235 and about 1.6 hydroxyl groups per molecule.

Melamine is 2,4,6-triamino-1,3,5-triazine, which is a curing agent for epoxy resins and has a melting point of about 350° C.

Dicyandiamide is a curing agent for epoxy resins and has a melting point of 208°-211° C.

FC-509 (available from Minnesota Mining and Manufacturing) is a curing agent for epoxy resins (by a cationic curing mechanism), which can be activated by ultraviolet light or by heat and which initiates rapid cure at 200° C.

Anchor 1725 is isophthaloyl dihydrazide, which has a melting point of about 224° C., and is a curing agent for epoxy resins.

DDS (available from Ciba-Geigy as "Eporal") is diamino diphenyl sulphone, which is a curing agent for epoxy resins and has a melting point of 170°-180° C.

Cab-o-Sil TS-200 (available from Cabot Corp.) is a very hydrophobic fumed silica powder of low bulk density and high surface area in which the silica has been modified by treatment with an organic silicone.

FC-430 (available from Minnesota Mining and Manufacturing) is a non-ionic fluorochemical surfactant.

We claim:

1. A heat-recoverable device which recovers at a temperature of 100° to 200° C. and which comprises an elastically deformed member held in an elastically deformed state by a polymeric restraint which, when heated, weakens, but does not melt or flow, at a temperature between 100° and 200° C. and thus permits elastic recovery of said elastically deformed member, said device having on a surface thereof which can contact another surface as a result of such elastic recovery a layer of a curable adhesive composition which (a) is solid, substantially free of cross-linking and substantially tack-free at 25° C.;

(b) after having been heated rapidly to 80° C., maintained at 80° C. for 10 days, and heated rapidly to 150° C., has a viscosity at 150° C. of at most $5 \times 10^4$ poise;

(c) when heated rapidly to 150° C. has an initial viscosity at 150° C. of $10^3$ to $10^4$ poise and after having been maintained at 150° C. for 1 hour has a viscosity at 150° C. of at most $5 \times 10^4$ poise; and (d) when heated rapidly to 200° C. and after having been maintained at 200° C. for 10 minutes is substantially void-free and has cured to a viscosity at 200° C. of at least $5 \times 10^5$ poise.

2. A device according to claim 1 wherein said composition has at least one of the following characteristics (e) it is solid, substantially free of cross-linking and substantially tack-free at 50° C.;

(f) after having been heated rapidly to 80° C., maintained at 80° C. for 165 days, and heated rapidly to 150° C., it has a viscosity at 150° C. of at most $5 \times 10^4$ poise; and (g) after having been heated rapidly to 200° C. and maintained at 200° C. for 5 minutes, it has cured to a viscosity at 200° C. of at least $5 \times 10^5$ poise.

3. A device according to claim 1 wherein said composition contains at least 65% by weight of a curable resin component, at least 40% by weight of said curable resin component being at least one polyfunctional epoxy resin.

4. A device according to claim 3 wherein said composition contains at least 85% by weight of said curable resin component.

5. A device according to claim 3 wherein said curable resin component comprises at least 40% by weight of at least one solid epoxy resin having a softening point of at least 50° C. and an epoxy equivalent weight of at least 110.

6. A device according to claim 3 wherein at least 70% by weight of said curable resin component is at least one epoxy resin.

7. A device according to claim 6 wherein said curable resin component comprises at least 40% by weight of at least one solid epoxy resin having a softening point of at least 50° C. and an epoxy equivalent weight of at least 110.

8. A device according to claim 7 wherein said epoxy resin comprises an epoxy novolak resin.

9. A device according to claim 6 wherein said curable resin component comprises
   (a) 10 to 30% by weight of a flexible epoxy resin having a viscosity at 25° C. of 10 to 100 poise and an epoxy equivalent weight of 500 to 1,000, and
   (b) 50 to 90% by weight of at least one solid epoxy resin having a softening point of at least 50° C. and an epoxy equivalent weight of at least 110.

10. A device according to claim 9 wherein said epoxy resin (a) has a viscosity at 25° C. of 15 to 60 poise.

11. A device according to claim 9 wherein said epoxy resin (b) comprises at least one epoxy resin having an epoxy equivalent weight of at least 175.

12. A device according to claim 9 wherein said epoxy resin (b) comprises at least one epoxy resin which has an epoxy equivalent weight of at least 175 and which is substantially free of hydroxyl functionality and at least one epoxy resin which has an epoxy equivalent weight of at least 375.

13. A device according to claim 12 wherein said epoxy resin (b) comprises a novolak epoxy resin and a Bisphenol A epoxy resin.

14. A device according to claim 3 wherein said composition contains
   (a) 40 to 90% by weight of at least one epoxy resin having a softening point of at least 50° C. and an epoxy equivalent weight of at least 110; and
   (b) 10 to 30% by weight of a polymer which is compatible with said epoxy resin and which has a molecular weight of at least 5,000.

15. A device according to claim 14 wherein said polymer (b) is an elastomer.

16. A device according to claim 15 wherein said elastomer is a nitrile rubber.

17. A device according to claim 14 wherein said polymer (b) is a polyamide.

18. A device according to claim 14 wherein said epoxy resin (a) comprises at least one epoxy resin having an epoxy equivalent weight of at least 175.

19. A device according to claim 14 wherein said epoxy resin (a) comprises at least one epoxy resin which has an epoxy equivalent weight of at least 175 and which is substantially free of hydroxyl functionality and at least one epoxy resin which has an epoxy equivalent weight of at least 375.

20. A device according to claim 3 wherein said composition contains isophthaloyl dihydrazide as a curing agent for said epoxy resin.

21. A device according to claim 3 wherein said composition contains 1 to 10% of a particulate, high surface area filler.

22. A device according to claim 3 wherein said composition contains 1 to 10% by weight of a fibrous filler.

23. A device according to claim 3 wherein said composition contains up to 1% by weight of a fluorine-substituted surfactant.

24. A device according to claim 1 which recovers at a temperature of 150° to 200° C.

25. A device according to claim 1 which has been heated under conditions which cause the device to recover and the layer of curable adhesive thereon to cure.

26. A device according to claim 1 wherein said restraint is composed of a cross-linked thermoplastic polymer.

27. A device according to claim 26 wherein the polymer is poly(vinylidene fluoride).

28. A device according to claim 1 wherein said elastically deformed member is made of a memory metal.

29. A device according to claim 28 wherein said memory metal has an austenite/martensite transformation temperature below room temperature.

* * * * *